(12) United States Patent
Mansour (10) Patent No.: US 7,633,913 B2
(45) Date of Patent: Dec. 15, 2009

(54) WIRELESS COMMUNICATION SYSTEM USING JOINT DETECTION TO COMPENSATE FOR POOR RF CONDITION BASED ON USER PRIORITY

(75) Inventor: Nagi Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 816 days.

(21) Appl. No.: 10/982,060

(22) Filed: Nov. 5, 2004

(65) Prior Publication Data

US 2006/0099953 A1 May 11, 2006

(51) Int. Cl.
*H04B 7/216* (2006.01)
*H04W 72/00* (2006.01)
*H04W 4/00* (2006.01)

(52) U.S. Cl. .............. 370/338; 370/335; 370/342; 455/452.2

(58) Field of Classification Search .......... 370/335, 370/338, 342; 455/403, 452.2
See application file for complete search history.

(56) References Cited

U.S. PATENT DOCUMENTS

| | | | |
|---|---|---|---|
| 6,038,223 A | 3/2000 | Hansson et al. | |
| 6,181,917 B1 | 1/2001 | Mansour et al. | |
| 6,226,279 B1 | 5/2001 | Hansson et al. | |
| 6,278,706 B1 | 8/2001 | Gibbs et al. | |
| 6,292,671 B1 | 9/2001 | Mansour | |
| 6,389,005 B1 | 5/2002 | Cruickshank | |
| 6,452,933 B1 * | 9/2002 | Duffield et al. | 370/415 |
| 6,483,823 B1 | 11/2002 | Mansour | |
| 6,490,252 B1 | 12/2002 | Riggan et al. | |
| 6,654,364 B1 | 11/2003 | Mansour | |
| 6,865,389 B2 * | 3/2005 | Lee et al. | 455/442 |
| 6,978,144 B1 * | 12/2005 | Choksi | 455/452.2 |
| 7,133,672 B2 * | 11/2006 | Sayeedi | 455/432.1 |
| 7,218,624 B2 * | 5/2007 | Becker et al. | 370/335 |
| 7,289,551 B2 | 10/2007 | Kenney et al. | |
| 7,366,140 B2 | 4/2008 | van Rensburg et al. | |
| 2003/0036408 A1 * | 2/2003 | Johansson et al. | 455/560 |
| 2003/0054816 A1 * | 3/2003 | Krebs et al. | 455/428 |
| 2003/0095499 A1 | 5/2003 | Kim et al. | |

(Continued)

FOREIGN PATENT DOCUMENTS

WO WO 2005/053176 * 6/2005

OTHER PUBLICATIONS

COFDM as a modulation technique for wireless telecommunications, with CDMA comparison, pp. 19-24, Eric Lawrey 1997.

(Continued)

*Primary Examiner*—Lester Kincaid
*Assistant Examiner*—Nathan Mitchell (57) ABSTRACT

A wireless communication system including a carrier network, a network application server coupled to the carrier network, and a base station coupled to the carrier network. The base station is adapted to determine whether a subscriber unit is designated as having relatively high priority for accessing the carrier network; encode data for joint detection and transmit the encoded data to the subscriber unit if the subscriber unit is designated as having relatively high priority for accessing the carrier network; or transmit the data to the subscriber unit without encoding the data for joint detection if the subscriber unit is not designated as having relatively high priority for accessing the carrier network.

17 Claims, 4 Drawing Sheets

U.S. PATENT DOCUMENTS

| | | | |
|---|---|---|---|
| 2003/0163581 A1* | 8/2003 | Moran et al. | 709/235 |
| 2003/0224798 A1 | 12/2003 | Willenegger et al. | |
| 2004/0137964 A1* | 7/2004 | Lynch et al. | 455/575.1 |
| 2004/0141479 A1 | 7/2004 | Cha et al. | |
| 2004/0170182 A1* | 9/2004 | Higashida et al. | 370/401 |
| 2006/0203758 A1 | 9/2006 | Tee et al. | |
| 2006/0221939 A1 | 10/2006 | Rosen et al. | |

OTHER PUBLICATIONS

Capacity Simulation of cdma2000 1xEv Wireless Internet Access System, Peter J. Black and Mehmet I. Gurelli, Qualcomm Incorporated.

Basic Joint Detection Methods for CDMA, pp. 1-22, Christian Schlegel.

Efficient Joint Detection Techniques for TD-CDMA in the Frequency Domain, Marius Vollmer, et al.

Joint Detection in TD-CDMA, pp. 1-4, Jul. 14, 2004.

A Wireless Packet Multiple Access Method Exploiting Joint Detection, pp. 1-16, Preeti Kota and Christian Schlegel.

Comparative Study of Joint-Detection Techniques for TD-CDMA based Mobile Radio Systems, Marius Vollmer et al., IEEE Journal on Selected Areas in Communications (Revised).

* cited by examiner

FIGURE 4B

WIRELESS COMMUNICATION SYSTEM USING JOINT DETECTION TO COMPENSATE FOR POOR RF CONDITION BASED ON USER PRIORITY

FIELD OF THE INVENTION

This invention relates generally to wireless communication systems, and in particular, to a wireless communication system that uses joint detection to compensate for a user's poor radio frequency (RF) condition based on the priority status, i.e., quality of service (QoS), of the user.

BACKGROUND OF THE INVENTION

Wireless communication systems have been extremely popular for more than a decade. They allow users to communicate with each other while remaining geographically mobile. These systems also allow communications to be in different modes, such as full-duplex voice, half-duplex voice, and data, as examples. An example of a wireless communication system protocol is 1xEV-DO which specifies the requirements for system that is optimized for data communication. Although an 1xEV-DO wireless communication system serves to exemplify the invention, it shall be understood that the invention is applicable to other types of wireless communication systems.

Figure 1:
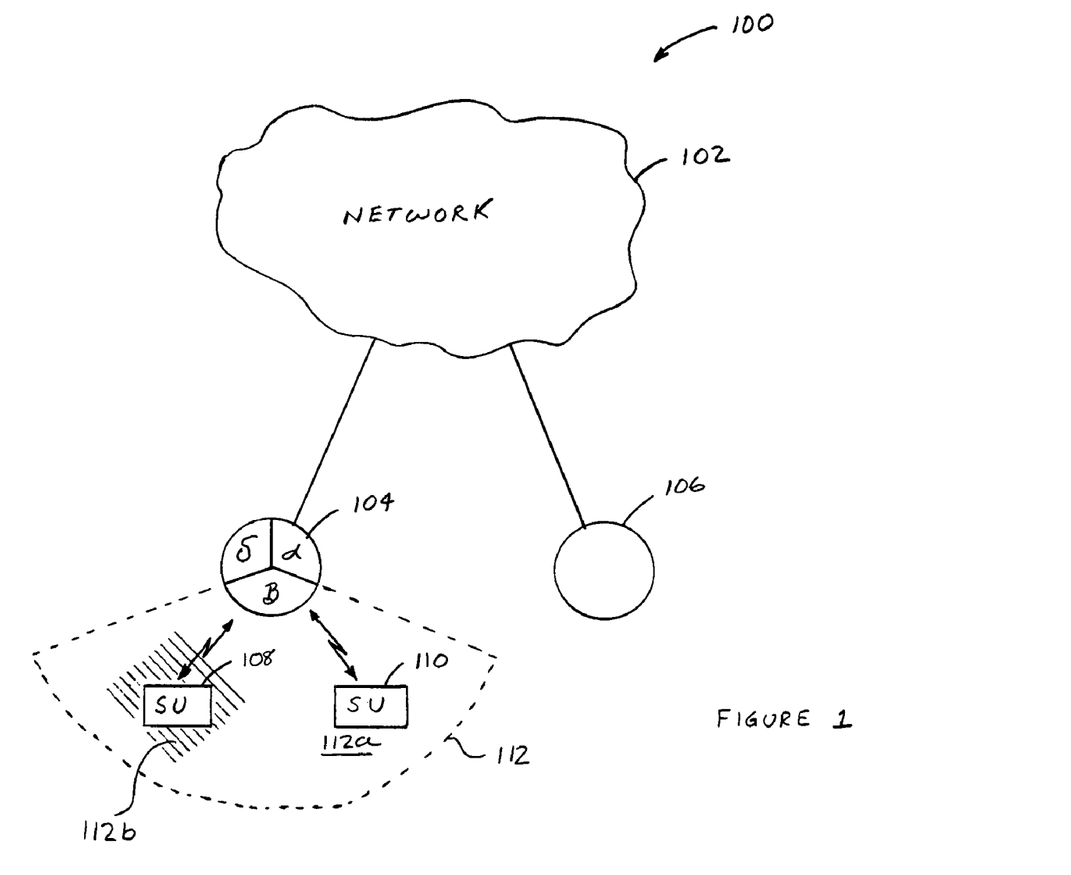
FIG. 1 illustrates a block diagram of an exemplary 1xEV-DO wireless communication system.

FIG. 1 illustrates a block diagram of an exemplary 1xEV-DO wireless communication system 100. The wireless communication system 100 comprises a network 102, and a plurality of base stations, two of which are shown as base stations 104 and 106. The wireless communication system 100 serves a plurality of subscriber units (SUs), two of which are shown as SUs 108 and 110 currently communicating with base station 104. The network 102 includes a plurality of network devices that provide data communication services to the SUs 108 and 110. The base stations 104 and 106 provide a wireless interface between the network 102 and the SUs 108 and 110.

In this example, base station 104 includes three different sectors α, β and δ. The SUs 108 and 110 are situated within the coverage area 112 of sector β of base station 104. In particular, SU 110 is located in a region 112a that has a relatively good RF environment. That is, in region 112a, SU 110 is able to transmit and receive data to and from the base station 104 at a relatively high data rate. Whereas, SU 108 is located in another region 112b that has a relatively poor RF environment. That is, in region 112b, SU 108 is only able to transmit and receive data to and from the base station 104 at a relatively low data rate because of the poor RF environment.

According to the 1xEV-DO protocol, the base stations 104 and 106 each includes a proportional fair scheduler that determines which SU has priority, i.e., better QoS, in obtaining a traffic channel for accessing the base stations, and ultimately, the network 102. The proportional fair scheduler prioritizes the allocation of traffic channel resources (e.g., time slots and data rates) based on a number of parameters. One such parameter is the RF condition of the SU. Generally, the proportional fair scheduler gives priority for traffic channel resources to SUs in good RF environment. For example, the proportional fair scheduler of base station 104 would give priority to SU 110 since it is in a relatively good RF environment. On the other hand, the proportional fair scheduler of base station 104 would not give priority to SU 108 since it is in a relatively poor RF environment.

However, a service provider may desire to designate certain SUs as having "high-priority" (i.e., higher QoS) for accessing the network. The service provider may, for example, give such "high-priority" status to users who have paid a premium price for services, who are employees of the service provider, and/or have been subscribers for a relatively long period. If, however, such user is situated in a poor RF environment as is SU 108, the user may not be given its deserved "high-priority" for accessing the network 102 because of the poor RF environment.

SUMMARY OF THE INVENTION

An aspect of the invention relates to a wireless communication system, comprising a carrier network; a network application server coupled to the carrier network; and a base station coupled to the carrier network. The base station is adapted to determine whether a subscriber unit is designated as having relatively high priority (i.e., higher QoS) for accessing the carrier network; and encode data for joint detection and transmit the encoded data to the subscriber unit if the subscriber unit is designated as having relatively high priority for accessing the carrier network; or transmit the data to the subscriber unit without encoding the data for joint detection if the subscriber unit is not designated as having relatively high priority for accessing the carrier network.

Another aspect of the invention relates to a base station comprising an RF interface and a processor adapted to determine whether a subscriber unit is designated as having relatively high priority (i.e., higher QoS) for accessing a network; and encode data for joint detection and transmit the encoded data to the subscriber unit by way of the RF interface if the subscriber unit is designated as having relatively high priority for accessing the network; or transmit the data to the subscriber unit without encoding the data for joint detection by way of the RF interface if the subscriber unit is not designated as having relatively high priority for accessing the network. A method and computer readable medium including one or more software modules related to the base station are also disclosed.

Yet another aspect of the invention relates to a subscriber unit comprising an RF interface and a processor adapted to transmit a request for data to a base station by way of the RF interface; receive a CDMA signal carrying the requested data by way of the RF interface, wherein the CDMA signal is encoded for joint detection; and perform joint detection on the encoded CDMA signal to obtain the requested data. A method and computer readable medium including one or more software modules related to the subscriber unit are also disclosed.

Still another aspect of the invention relates to a wireless communication system comprising a plurality of base stations that transmit data to subscriber units in compliance with an 1xEV-DO protocol, and further encodes the transmission of data for joint detection by the subscriber units.

Other aspects, features, and techniques of the invention will be apparent to one skilled in the relevant art in view of the following detailed description of the invention.

DETAILED DESCRIPTION OF THE EXEMPLARY EMBODIMENTS

Figure 2:
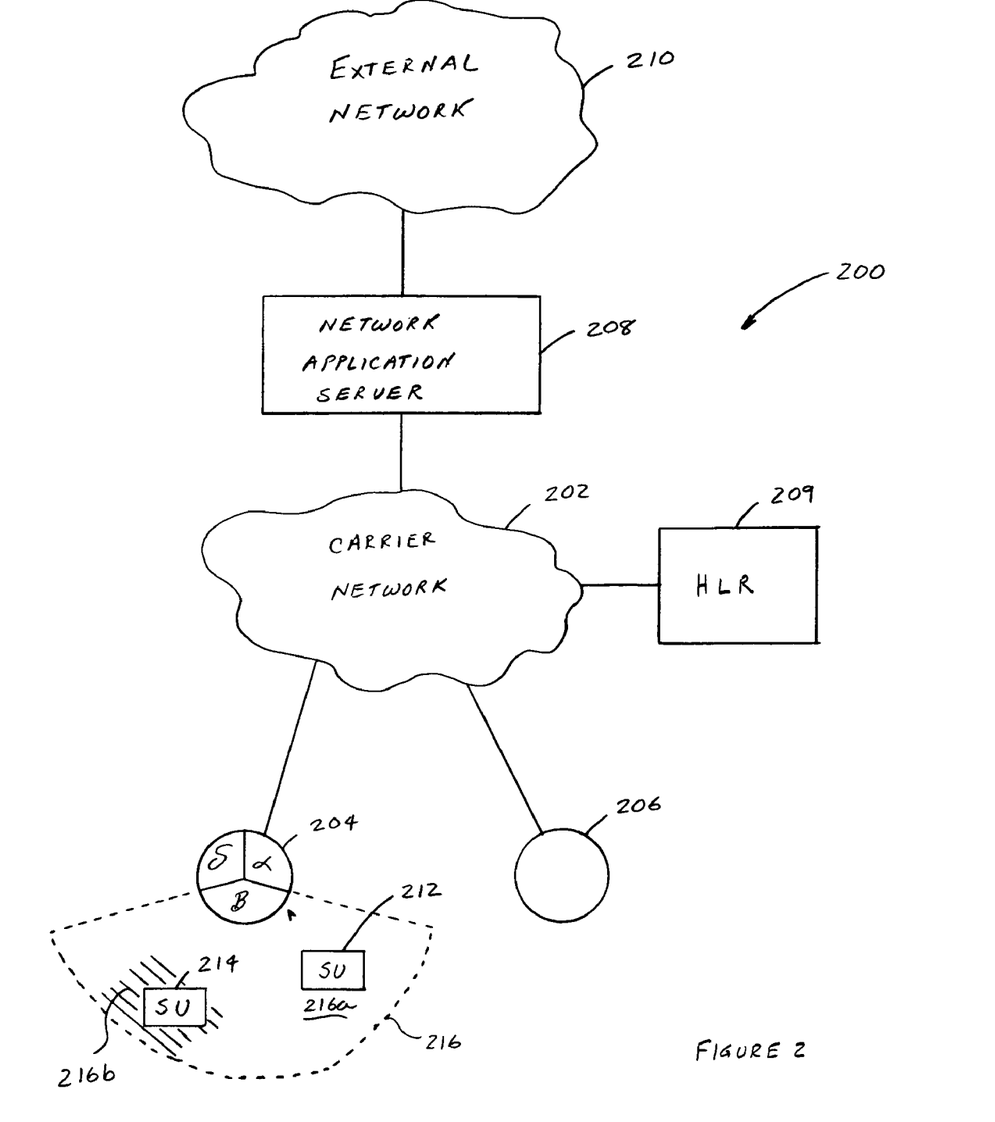
FIG. 2 illustrates a block diagram of an exemplary wireless communication system in accordance with an embodiment of the invention.

FIG. 2 illustrates a block diagram of an exemplary wireless communication system 200 in accordance with an embodiment of the invention. The wireless communication system 200 comprises a carrier network 202, a network application server 208 coupled to the carrier network 202, a home location register (HLR) 209 coupled to the carrier network 202, and a plurality of base stations 204 and 206 coupled to the carrier network 202. The wireless communication system 200 serves a plurality of subscriber units (SUs) 212 and 214 currently communicating with the base station 204. The network application server 208 may be coupled to an external network 210 to allow users to communicate with entities residing outside of the wireless communication system 200.

The network application server 208 provides communication services to the SUs. For example, the network application server 208 may provide data service to the SUs, i.e., allowing users to receive and transmit data. Alternatively, or in addition to, the network application server 208 may provide full-duplex voice service to the SUs, i.e., allowing users to communicate with each other (or with external entities) by way of full-duplex voice. Alternatively, or in addition to, the network application server 208 may provide half-duplex voice service to the SUs, i.e., allowing users to communicate with each other (or with external entities) by way of half-duplex voice. The network application server 208 could provide other communication services to the SUs.

The HLR 209 stores and provides upon request information related to subscribers. For instance, the HLR 209 stores and provides upon request information as to whether subscribers are designated as having relatively high priority (i.e., higher QoS) for accessing the network 202, or whether subscribers are designated as having relatively low priority (i.e., lower QoS) for accessing the network 202. As discussed in more detail below, the QoS status of subscribers is used by base stations in determining whether to encode data for joint detection by SUs.

The carrier network 202 couples the various network devices together, including the network application server 208, the HLR 209, and the base stations 204 and 206. It shall be understood that other devices may be coupled to the network 202, such as voice processing devices, gateways, etc. The carrier network 202 may be of any suitable type, including internet protocol (IP), asynchronous transfer mode (ATM), and frame relay.

As discussed above, the network application server 208 may be coupled to an external network 210 to allow users to communicate with entities outside of the wireless communication system 200. The external network 210 may be the Internet, a wide area network (WAN), a local area network (LAN), an intranet, or other type of packet-switch network. Alternatively, or in addition to, the external network 210 may be a public switch telephone network (PSTN) or another service provider network.

The base stations 204 and 206 provide a wireless interface between the carrier network 202 and the SUs. In this example, the base stations 204 and 206 use code division multiple access (CDMA) based RF protocol to communicate with the SUs. As is discussed in more detail later, the base stations 204 and 206 determine whether the SUs are designated as having "high-priority" (i.e., higher QoS) for accessing the network 202. If the SUs are designated as such, the base stations 204 and 206 encode the communication sent to the SUs such that the SUs can use joint detection for the purpose of acquiring the data while simultaneously compensating for adverse RF conditions. If the SUs are not designated as having "high-priority" for accessing the network 202, the base stations 204 and 206 transmits the data to the SUs pursuant to the applicable CDMA protocol (i.e., no joint detection encoding).

In this example, base station 204 includes three different sectors $\alpha$, $\beta$ and $\delta$. The SUs 212 and 214 are situated within the coverage area 216 of sector $\beta$ of base station 204. In particular, SU 212 is located in a region 216a that has a relatively good RF environment. Whereas, SU 214 is located in another region 216b that has a relatively poor RF environment.

Further, in this example, SU 214 is designated as having relatively "high-priority" (i.e., higher QoS) for accessing the carrier network 202, and SU 212 is designated as having "normal-priority" (i.e., lower QoS) for accessing the carrier network 202 (i.e., lower priority than the "high-priority" of SU 214). Since SU 214 has relatively "high-priority" for accessing the carrier network 202, the base station 204 encodes data intended for SU 214 for the purpose of joint detection by SU 214. The SU 214, in turn, decodes the data received from the base station 204 using joint detection, which allows SU 214 to compensate for it being situated in a poor RF environment. However, in the case of SU 212, which is designated as having "normal-priority" for accessing the network 202, the base station 204 may not encode data for joint detection when it sends it to SU 212.

A result of providing the "high-priority" SU 214 with joint detection capability is that although SU 214 is located in a poor RF environment, the proportional fair scheduler of the base station 204 may give SU 214 priority over SU 212 in accessing the carrier network 202 even though SU 214 is located in a poorer RF environment. This is because the joint detection compensates for the poor RF environment, and accordingly, may increase the transfer data rate of SU 214 to be higher than that of SU 212. The proportional fair scheduler of the base station 204, having sensed a higher transfer data rate for SU 214, may give SU 214 priority over SU 212 in accessing the carrier network 202.

There are many algorithms developed for joint detection. In general, a known preamble set of bits is added to the data transmitted per each Walsh code. The receiving SU has knowledge of the known preamble set of bits. Using the known preamble set of bits, the SU is able to characterize its RF environment. In particular, a matrix of coefficients is generated in the SU using the preamble input bits for all codes and the output collected. Then, the generated matrix of coefficient is used to rectify impairments that have occurred to the information bits. Joint detection is particularly suitable for 1xEV-DO systems because it only uses 16 Walsh codes. Therefore, the overhead incurred in processing the added preamble of bits is relatively minor.

Figure 3A:
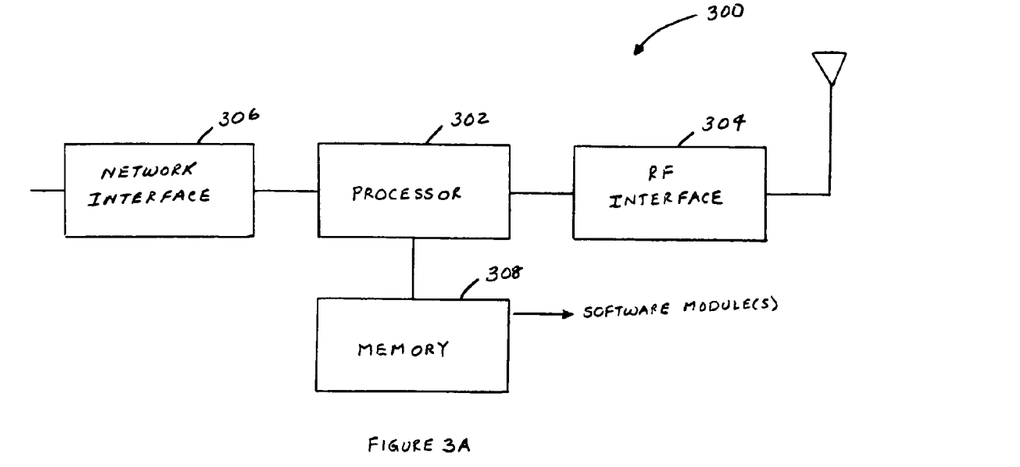
FIG. 3A illustrates a block diagram of an exemplary base station in accordance with another embodiment of the invention.

FIG. 3A illustrates a block diagram of an exemplary base station 300 in accordance with another embodiment of the invention. The base station 300 is an exemplary detail version of base stations 204 and/or 206 of wireless communication system 200. The base station 300 comprises a processor 302, an RF interface 304, a network interface 306, and a memory 308.

The processor 302 performs the various operations of the base station 300 as discussed with reference to FIG. 3B. The network interface 306 provides the base station 300 an interface to the network 202 to receive communications from and send communications to the network application server 208 and other network devices. The RF interface 304 including the antenna provide the base station 300 an interface to the wireless medium to receive communications from and send communications to SUs. The memory 308, serving generally as a computer readable medium, stores one or more software modules that control the processor 302 in performing its various operations. The operations implemented by the base station 300 are discussed as follows.

Figure 3B:
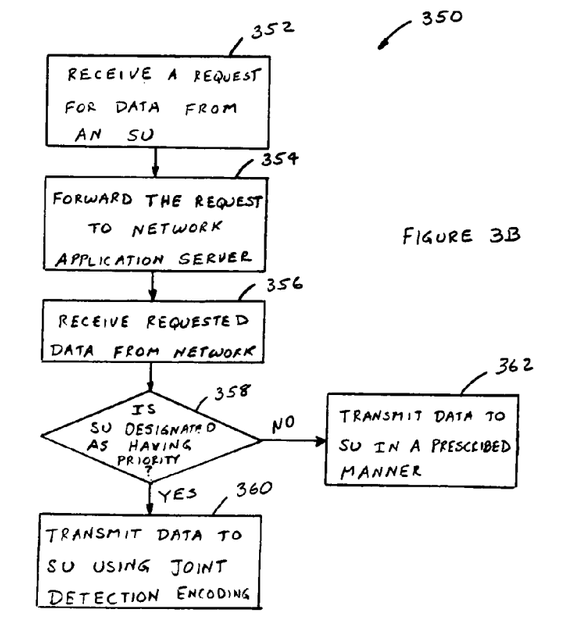
FIG. 3B illustrates a flow diagram of a method implemented by the base station in accordance with another embodiment of the invention.

FIG. 3B illustrates a flow diagram of an exemplary method 350 implemented by the base station 300 in accordance with another embodiment of the invention. According to the method 350, the processor 302 receives a request for data directed to the network application server 208 from an SU by way of the RF interface 304 (block 352). In response to receiving the request, the processor 302 forwards the request to the network application server 208 by way of the network interface 306 (block 354). After forwarding the request, the processor 302 receives the requested data from the network application server 208 by way of the network interface 306 (block 356).

The processor 302 then determines whether the requesting SU is designated as having relatively "high-priority" (i.e., higher QoS) for accessing the network 202 (block 358). The processor 302 may perform this operation by sending a query to the HLR 209 by way of the network interface 304, and receiving a response to the query from the HLR 209 also by way of the network interface 304. If the processor 302 determines that the requesting SU is designated as a "high-priority" SU, the processor 302 encodes the data for joint detection, and transmits it to the requesting SU by way of the RF interface 304 (block 360). Otherwise, the processor 302 transmits the data to the SU using the prescribed CDMA RF protocol (block 362).

Figure 4A:
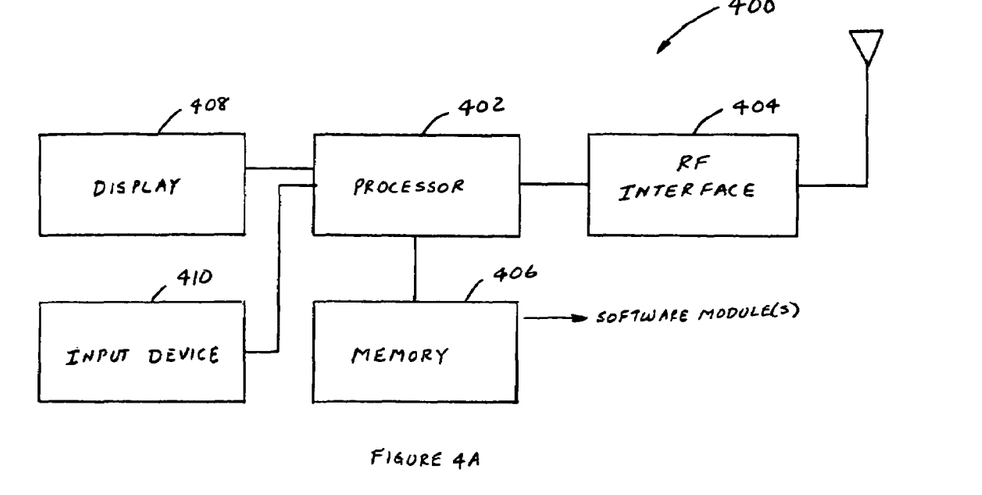
FIG. 4A illustrates a block diagram of an exemplary subscriber unit in accordance with another embodiment of the invention.

FIG. 4A illustrates a block diagram of an exemplary subscriber unit 400 in accordance with another embodiment of the invention. The subscriber unit 400 is an exemplary detail version of SU 214 of wireless communication system 200. The subscriber unit 400 comprises a processor 402, an RF interface 404, a memory 406, a display 408, and an input device 410.

The processor 402 performs the various operations of the subscriber unit 400 as discussed with reference to FIG. 4B. The RF interface 404 including the antenna provide the subscriber unit 400 an interface to the wireless medium to receive communications from and send communications to base stations. The memory 406, serving generally as a computer readable medium, stores one or more software modules that control the processor 402 in performing its various operations. The display 408 provides visual information to the user. The input device 410 allows a user to provide information to the processor 402. It shall be understood that the display 408 and input device 410 may be an integrated unit, such as a touch-sensitive screen. The operations implemented by the subscriber unit 400 are discussed as follows.

Figure 4B:
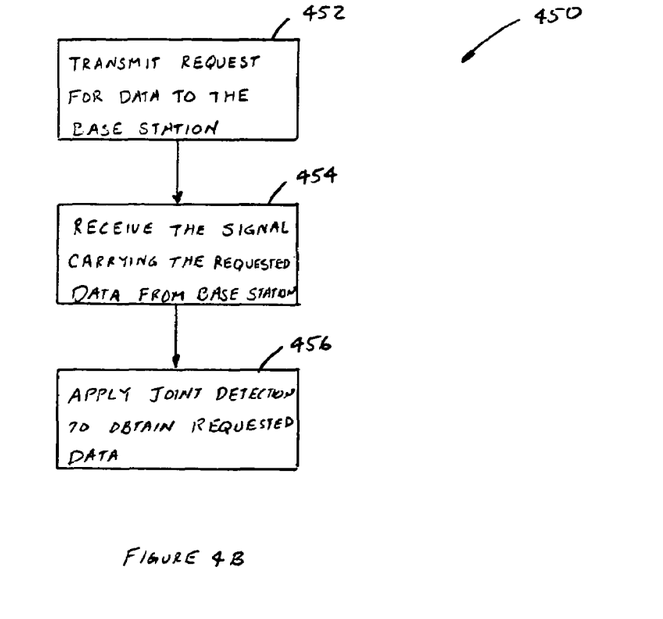
FIG. 4B illustrates a flow diagram of a method implemented by the subscriber unit in accordance with another embodiment of the invention.

FIG. 4B illustrates a flow diagram of a method 450 implemented by the subscriber unit 400 in accordance with another embodiment of the invention. According to the method 450, the processor 402 transmits a request for data to a base station by way of the RF interface 404 (block 452). In particular, the user may use the display 408 and input device 410 to initiate the request. After the processor 402 has transmitted the request for data, the processor 404 receives the CDMA signal carrying the requested data from the base station by way of the RF Interface 404 (block 454). Then, the processor 402 performs joint detection on the received CDMA signal to obtain the requested data (block 456). In obtaining the requested data, the processor 402 compensates for the RF environment using the known set of bits appended to the data.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A wireless communication system, comprising:
   a carrier network;
   a network application server coupled to the carrier network; and
   a base station coupled to said carrier network, wherein said base station is configured to:
      determine that a first subscriber unit is designated as having relatively high priority for accessing said carrier network and that a second subscriber unit is not designated as having relatively high priority for accessing said carrier network;
      encode data for joint detection and transmit said encoded data to said first subscriber unit; and
      transmit data to said second subscriber unit without encoding said data for joint detection,
   wherein the base station includes a proportional fair scheduler that increases a transfer data rate to the first subscriber unit to be higher than that of the second subscriber unit even though the first subscriber unit is located in a poorer radio frequency environment than the second subscriber unit.

2. The wireless communication system of claim 1, wherein said base station is further configured to receive a request for said data from said first or second subscriber unit.

3. The wireless communication system of claim 2, wherein said base station is further configured to forward said request for said data to said network application server by way of said carrier network.

4. The wireless communication system of claim 3, wherein said base station is further configured to receive said requested data from said network application server by way of said carrier network.

5. A method for a base station, comprising:
   determining that a first subscriber unit is designated as having relatively high priority for accessing a network and that a second subscriber unit is not designated as having relatively high priority for accessing said carrier network;
   encoding data for joint detection by adding a preamble set of bits, known to the first subscriber unit, to the data and transmitting said encoded data to said first subscriber unit; and
   transmitting data to said second subscriber unit without encoding said data for joint detection,
   wherein the base station includes a proportional fair scheduler that increases a transfer data rate to the first subscriber unit to be higher than that of the second subscriber unit even though the first subscriber unit is located in a poorer radio frequency environment than the second subscriber unit.

6. The method of claim 5, further comprising receiving a request for said data from said first or second subscriber unit.

7. The method of claim 6, further comprising forwarding said request for said data to a network application server by way of said network.

8. The method of claim 7, further comprising receiving said data from said network application server by way of said network.

9. A base station, comprising:
an RE interface; and
a processor configured to:
  determine that a first subscriber unit is designated as having relatively high priority for accessing a network and that a second subscriber unit is not designated as having relatively high priority for accessing said network;
  encode data for joint detection and transmit said encoded data to said first subscriber unit by way of said RE interface; and
  transmit data to said second subscriber unit without encoding said data for joint detection by way of said RE interface,
wherein the base station includes a proportional fair scheduler that increases a transfer data rate to the first subscriber unit to be higher than that of the second subscriber unit even though the first subscriber unit is located in a poorer radio frequency environment than the second subscriber unit.

10. The base station of claim 9, wherein said processor is further configured to receive a request for said data from said first or second subscriber unit by way of said RE interface.

11. The base station of claim 10, further comprising a network interface, and wherein said processor is further configured to forward said request for said data to a network application server by way of said network interface.

12. The base station of claim 11, wherein said processor is further configured to receive said requested data from said network application server by way of said network interface.

13. A computer readable medium storing one or more software modules to control a processor of a base station to:
  determine that a first subscriber unit is designated as having relatively high priority for accessing a network and that a second subscriber unit is not designated as having relatively high priority for accessing said network;
  encode data for joint detection and transmit said encoded data to said subscriber unit; and
  transmit said data to said subscriber unit without encoding said data for joint detection,
wherein the base station includes a proportional fair scheduler that increases a transfer data rate to the first subscriber unit to be higher than that of the second subscriber unit even though the first subscriber unit is located in a poorer radio frequency environment than the second subscriber unit.

14. The computer readable medium of claim 13, wherein said one or more software modules are configured to control said processor to receive a request for said data from said first or second subscriber unit.

15. The computer readable medium of claim 14, wherein said one or more software modules are configured to control said processor to forward said request for said data to a network application server.

16. The computer readable medium of claim 15, wherein said one or more software modules are configured to receive said requested data from said network application server.

17. A wireless communication system comprising:
a plurality of base stations that transmit data to subscriber units in compliance with an 1xEV-DO protocol, wherein each of the plurality of base stations is configured to
  determine that a first subscriber unit is designated as having relatively high priority for accessing said carrier network and that a second subscriber unit is not designated as having relatively high priority for accessing said carrier network;
  encode data for joint detection and transmit said encoded data to said first subscriber unit; and
  transmit data to said second subscriber unit without encoding said data for joint detection,
wherein each of the plurality of the base stations includes a proportional fair scheduler that increases a transfer data rate to the first subscriber unit to be higher than that of the second subscriber unit even though the first subscriber unit is located in a poorer radio frequency environment than the second subscriber unit.

* * * * *

UNITED STATES PATENT AND TRADEMARK OFFICE
CERTIFICATE OF CORRECTION

| | |
|---|---|
| PATENT NO. | : 7,633,913 B2 |
| APPLICATION NO. | : 10/982060 |
| DATED | : December 15, 2009 |
| INVENTOR(S) | : Nagi Mansour |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1399 days.

Signed and Sealed this

Ninth Day of November, 2010

David J. Kappos
*Director of the United States Patent and Trademark Office*